Figure 7:
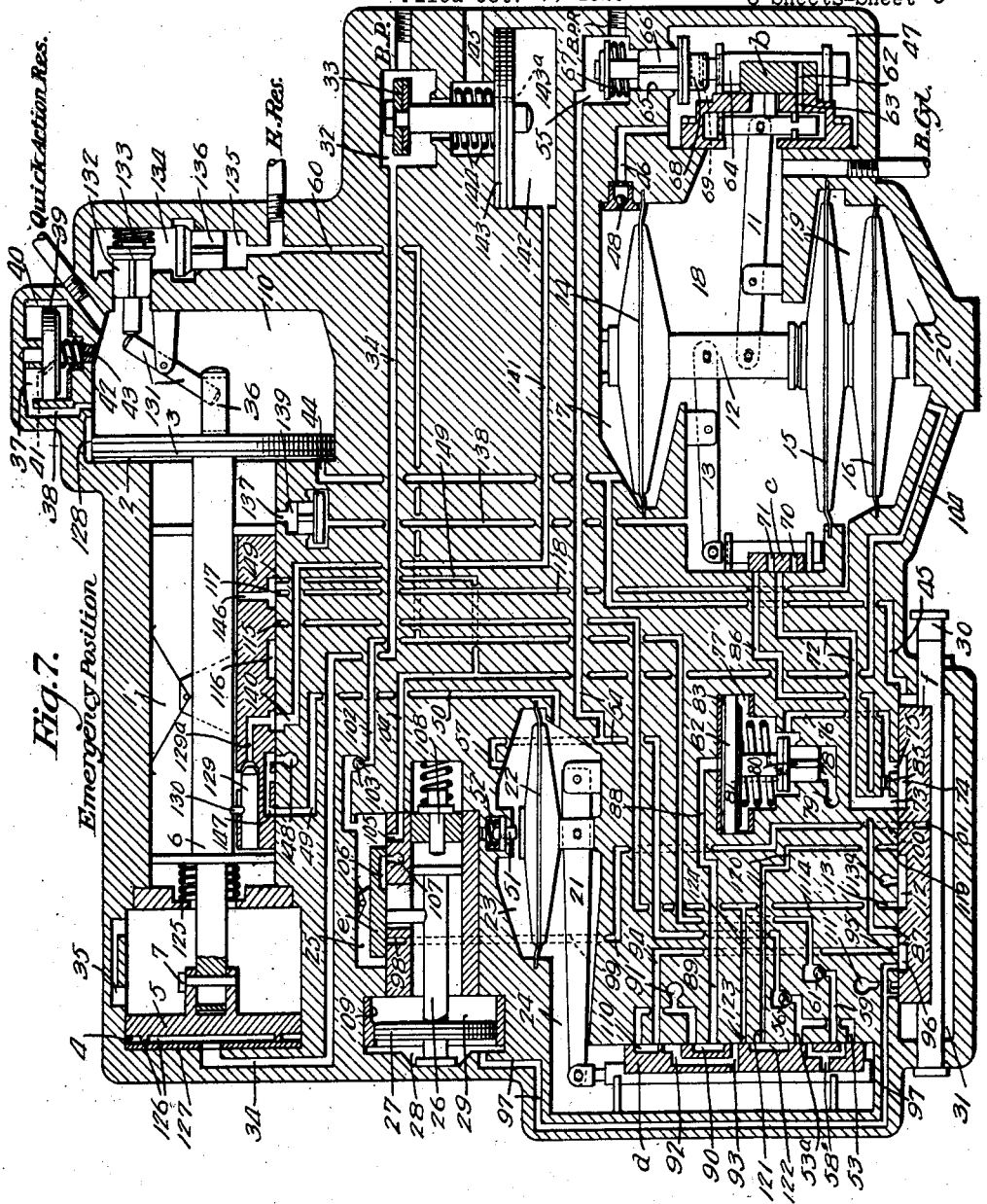

Fig. 1.

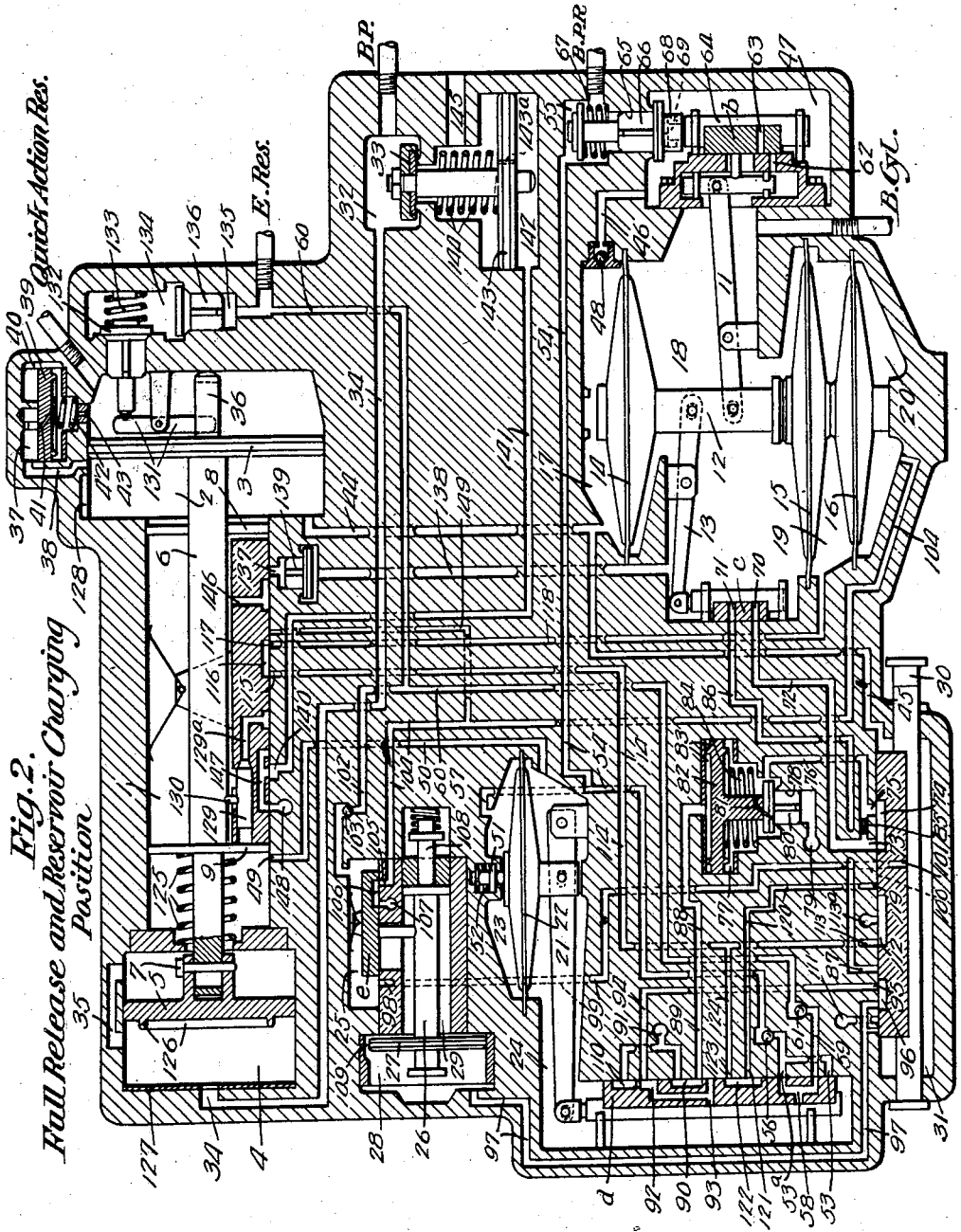

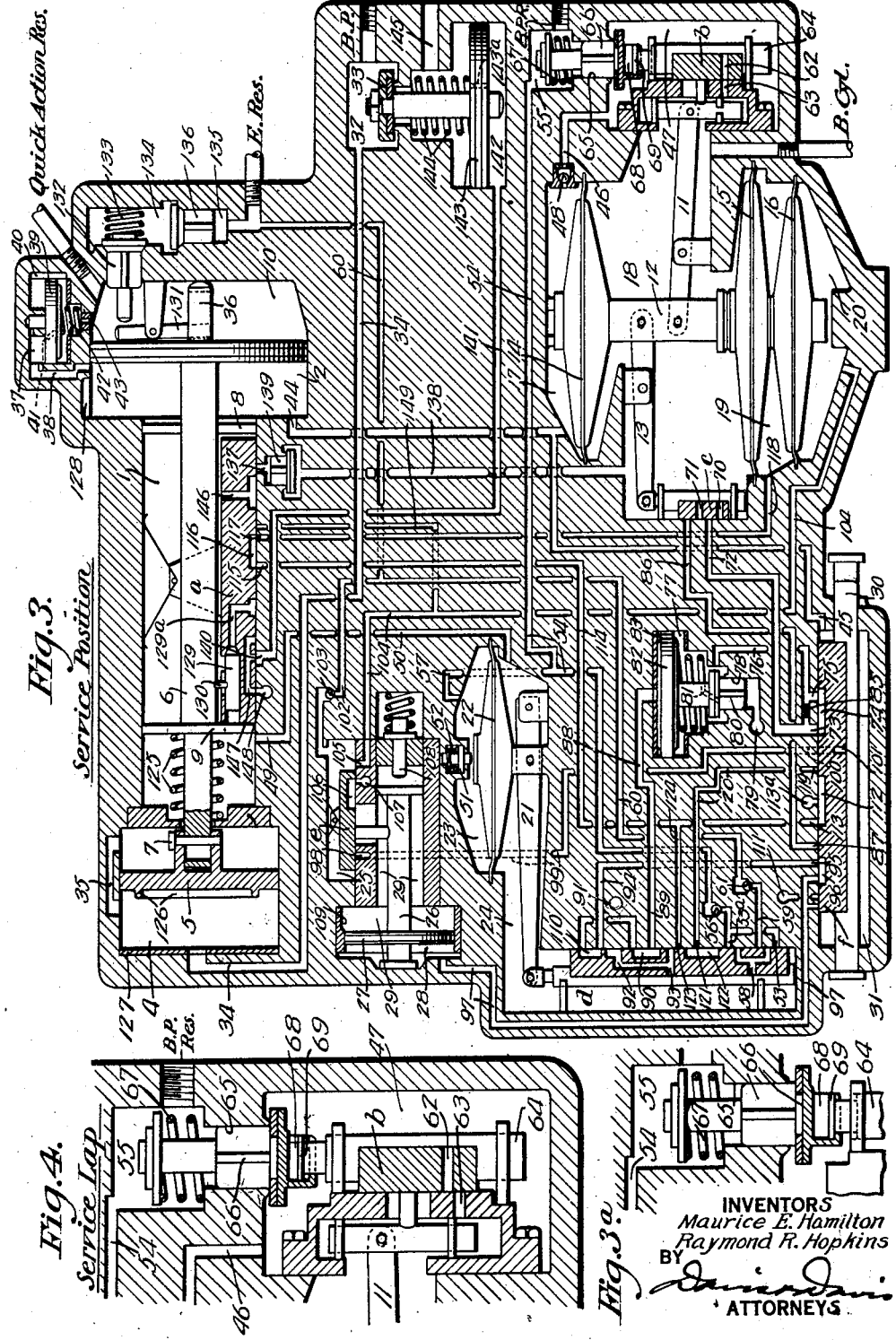

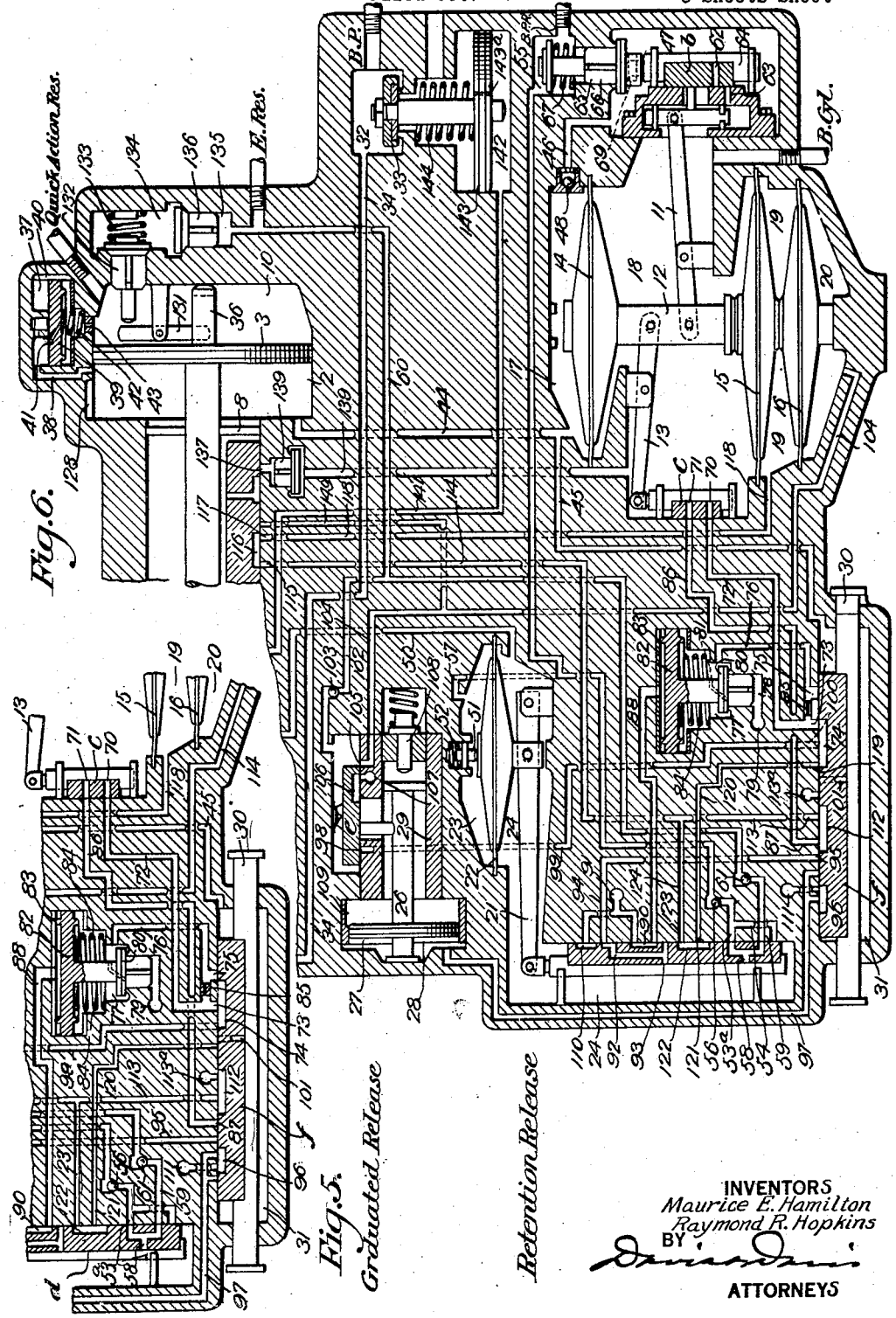

Aug. 30, 1927.

M. E. HAMILTON ET AL 1,640,499

AIR BRAKE APPARATUS

Filed Oct. 7, 1926    6 Sheets-Sheet 5

INVENTORS
Maurice E. Hamilton
Raymond R. Hopkins
BY
ATTORNEYS

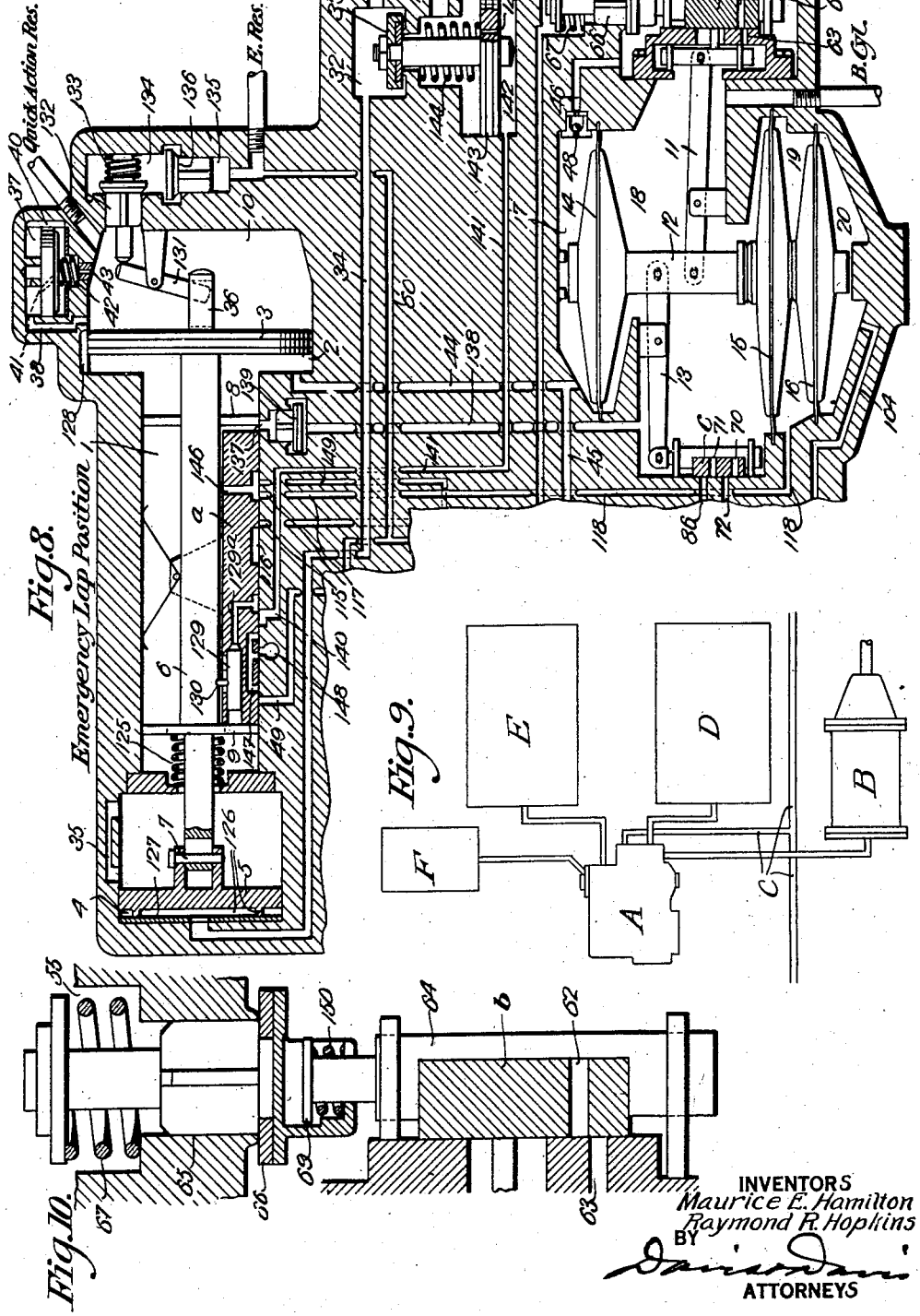

Patented Aug. 30, 1927.

1,640,499

UNITED STATES PATENT OFFICE.

MAURICE E. HAMILTON, OF LA FAYETTE, AND RAYMOND R. HOPKINS, OF WEST LA FAYETTE, INDIANA, ASSIGNORS TO AUTOMATIC STRAIGHT AIR BRAKE COMPANY, OF WILMINGTON, DELAWARE, A CORPORATION OF DELAWARE.

AIR-BRAKE APPARATUS.

Application filed October 7, 1926. Serial No. 139,989.

This invention relates to improvements in air brake apparatus in which the brake pipe volume is augmented by a brake pipe reservoir, air from the brake pipe and from the augmenting brake pipe reservoir being admitted to the brake cylinder for service applications of the brakes. An emergency reservoir is provided and air from said emergency reservoir is admitted to the brake cylinder for emergency applications of the brakes. Emergency reservoir air is also admitted into the brake pipe for a quick release of the brakes. The control valve is operated to service position by a slow and moderate reduction of brake pipe pressure and operates to emergency position upon a sudden reduction of brake pipe pressure. An increase of brake pipe pressure operates the control valve to release position.

One of the objects of the invention is to provide means whereby the brake pipe augmenting reservoir pressure will not be reduced with the brake pipe pressure when the brake pipe pressure is reduced for an application of the brakes. When the control valve is in service position the brake pipe air and the brake pipe reservoir air flow to the brake cylinder for a service application of the brakes.

Another object of the invention is to provide a service application valve and a separate and independent brake cylinder release valve, both of said valves being controlled by the same operating means and said operating means being subject to brake pipe, brake cylinder, and emergency reservoir pressures, and responding to variations in brake pipe pressure.

Another object of the invention is to provide means whereby the emergency reservoir air may be discharged into the brake pipe for a quick release of the brakes, said means controlling the amount of emergency reservoir air discharged into the brake pipe.

Another object of the invention is to provide a charging valve controlled by the opposed pressures of the brake pipe and brake pipe reservoir; and to provide means whereby said charging valve will control and operate a valve for retarding the release of brake cylinder pressure and will also operate a valve controlling the discharge of emergency reservoir air into the brake pipe for a quick release of the brakes. When operating in retention release, as hereinafter described, the charging valve controls the discharge of air from the retention chamber of the diaphragm structure, and thereby governs the ratio of brake cylinder pressure built up in cycling operation.

Another object of the invention is to provide an emergency slide valve which will move only in response to an emergency reduction of brake pipe pressure. This emergency valve remains stationary during all other operations of the control valve except that it moves to emergency lap position upon an equalization of emergency pressure in the various chambers of the control valve.

There are many other objects and advantages of the invention which will appear hereinafter.

In the drawings:

Figure 1:
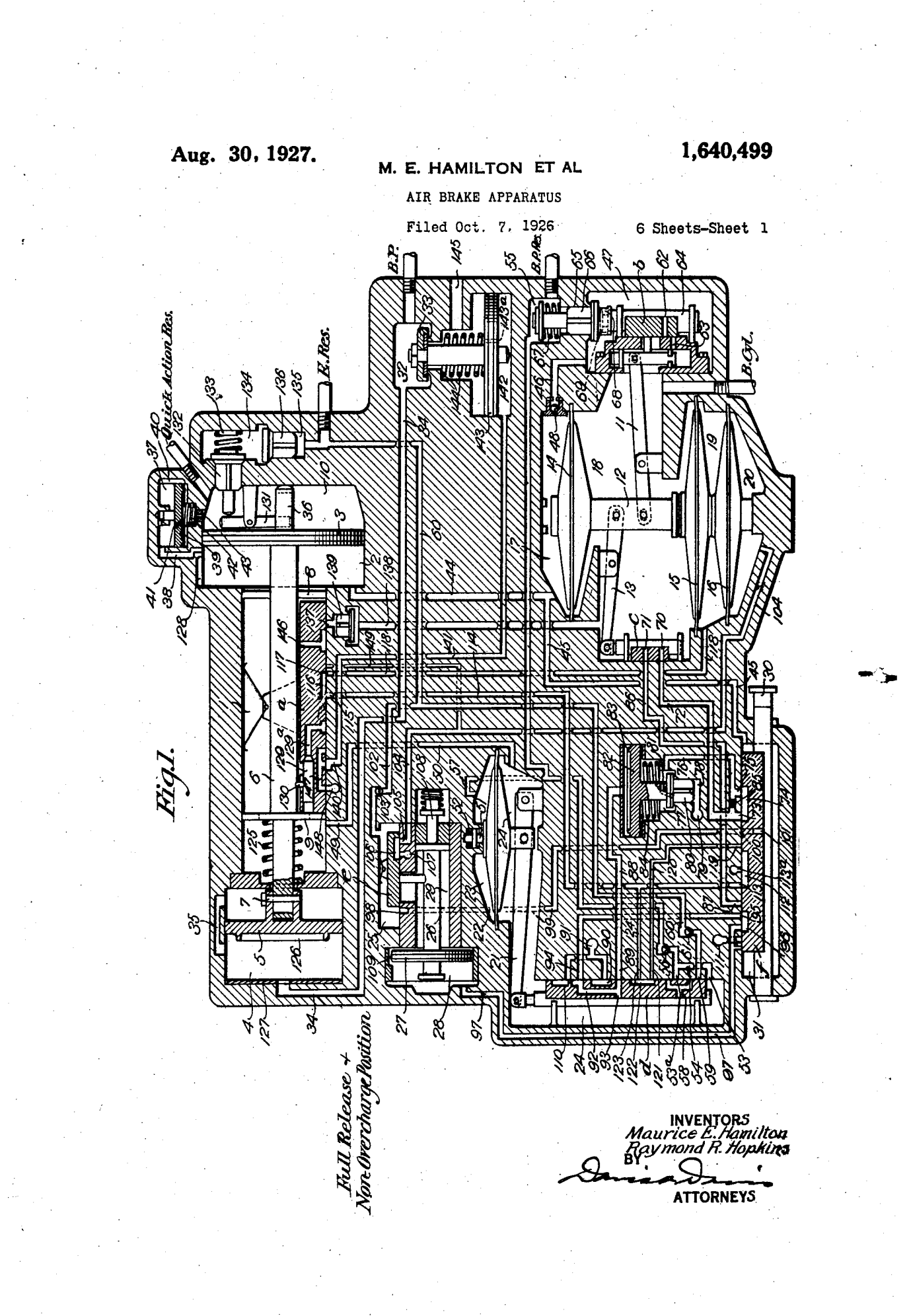

Fig. 1 is a diagrammatic view of a control valve constructed in accordance with this invention, the parts being shown in release and brake pipe reservoir charging position, the release governing valve being in quick release position. This is the non-overcharge position which results from an excessive rise in brake pipe pressure;

Fig. 2 a view similar to Fig. 1 showing the parts in normal charging position, in which position the emergency reservoir and the brake pipe reservoir are charged at the same time. This position results from a normal rise in brake pipe pressure during the charging operation;

Fig. 3 a view similar to Fig. 1 showing the parts in service application position;

Fig. 3ª a detail sectional view of the service application valve in service position;

Fig. 4 a detail view of the service application valve in service lap position;

Fig. 5 a diagrammatic view of a portion of the control valve showing the parts in graduated release position;

Fig. 6 a view similar to Fig. 5 showing the parts in retention release position;

Fig. 7 a view similar to Fig. 1 showing the parts in emergency application position;

Fig. 8 a view similar to Fig. 7 showing the parts in emergency lap position;

Fig. 9 a diagrammatic view of the apparatus; and

Fig. 10 a detail view of the service valve provided with a service lap spring.

In order to simplify the description of the control valve, the various parts and the ports and passages will not be specifically described except in connection with the various operations of the valve.

In the diagrammatic view Fig. 9, A designates the control valve, B the brake cylinder, C the brake pipe, D the service reservoir, E the emergency reservoir and F the quick action reservoir.

A control valve constructed in accordance with this invention comprises an emergency slide valve *a*, a service application valve *b*, a release valve *c*, a charging valve *d*, a quick release control valve *e*, and a manually operable release governing valve *f*. The emergency slide valve moves only in response to an emergency reduction of brake pipe pressure and moves to emergency lap position upon an equalization of emergency pressure in the various chambers of the control valve. In all other operations of the control valve the emergency valve remains stationary. The service application valve and the release valve are operated by a diaphragm structure in which the diaphragm are subject to brake pipe, brake cylinder and emergency reservoir pressures, the diaphragm structure responding to variations in brake pipe pressure and the application valve and the release valve performing their functions independently of each other. The charging valve controls the charging of the system. This valve has a normal charging position and a non-overcharge position. The non-overcharge position results from an excessive rise in brake pipe pressure and in this position the brake pipe reservoir alone will be charged. In the normal charging position of this valve the brake pipe reservoir and the emergency reservoir will be charged simultaneously. The quick release control valve controls the amount of emergency reservoir air dumped into the brake pipe for a quick release of the brakes. The manually operable release governing valve has three positions, a quick release position, a graduated release position and a retention release position. In the quick release position it provides for a full quick release of the brake cylinder pressure and in its graduated release position it provides for a slow release of brake cylinder pressure. In its retention release position it provides for building up brake cylinder pressure during cycling operations.

The control valve is provided with a main valve chamber 1 in which is arranged the emergency valve *a*. The chamber 1 is formed at one end with an emergency piston chamber 2 in which is arranged a large emergency piston 3. At its other end the main valve chamber is formed with a small chamber 4 in which is arranged a supplemental piston 5. Connected to the piston 3 is a valve stem 6 which extends through the main valve chamber and is connected to the supplemental piston 5 by a pin-and-slot connection 7 so that there will be a slight lost motion between these two connected parts. The emergency slide valve is connected to the piston valve stem 6 by flanges 8 and 9, there being a slight lost motion between the valve and these flanges, for a purpose which will hereinafter appear. The piston 3 serves as a movable abutment which separates a quick action chamber 10 from the main valve chamber. The quick action reservoir F is connected directly to the quick action chamber.

The service application valve *b* is connected by a lever 11 to the central stem 12 of the diaphragm structure. The release valve *c* is connected to said central stem by a lever 13. The diaphragm structure comprises an actuating diaphragm 14, an equalizing diaphragm 15, and an emergency diaphragm 16. Between the actuating diaphragm and the wall of the valve casing is formed an actuating chamber 17; between the actuating diaphragm and the equalizing diaphragm is formed a brake cylinder chamber 18; between the equalizing diaphragm and the emergency diaphragm is formed a retention chamber 19 and between the emergency diaphragm and the adjacent wall of the valve casing is formed an emergency reservoir chamber 20. The levers 11 and 13 and the release valve *c* are all arranged in the brake cylinder chamber 18. The brake cylinder B is connected directly to chamber 18.

The charging valve *d* is connected to a lever 21 and said lever is operatively connected to a charging diaphragm 22. The diaphragm 22 separates a brake pipe reservoir chamber 23 from a charging chamber 24, said chamber surrounding the charging valve and forming a charging valve chamber.

The release control valve *e* is mounted in a chamber 25 and is operatively connected to the piston stem 26 of the release control valve piston 27. The piston 27 is mounted in a chamber 28 and the piston stem 26 extends through a small equalizing chamber 29. The release governing valve *f* is connected to a manually operable rod 30 by means of which the valve may be set in any one of its three positions. The release governing valve is mounted in a release governing valve chamber 31.

*Release and brake pipe reservoir charging position—Nonovercharge position (Fig. 1).*

When charging the system air passes from the brake pipe into a small chamber 32 above an emergency brake pipe vent valve 33 and flows through passage 34 into chamber 4 in front of the supplemental piston 5. From chamber 4 air will flow through groove 35 around the piston 5 and into the main valve chamber 1. The air flowing into chamber 4 will force the supplemental piston and the emergency piston toward the right, as viewed in Fig. 1, until the stop pin 36 contacts with the wall of the quick action chamber 10. This will arrest the supplemental piston, the emergency piston, and the emergency slide valve in their normal charging positions. A small chamber 37 is connected to the main valve chamber by a port 38 said port being uncovered when the main emergency piston 3 is in its normal or charging position. In the chamber 37 is mounted a non-overcharge valve 39 said valve being in the form of a piston arranged to reciprocate in said chamber. Around said piston is formed a normal charging groove 40 and through said piston is formed a restricted charging port 41. A spring 42 normally holds the valve 39 raised to uncover or open the charging port 43 which opens into the quick action chamber. The quick action reservoir F is connected directly to the chamber 10 and receives its charge therefrom. When the rise in brake pipe pressure is rapid, or excessive, the pressure builds up on top of the valve 39 and forces it downward against the tension of the spring 42 and seats said valve, thereby closing the charging groove 40. Air will then pass through the restricted charging port 41 to the chamber 10 and to the quick action reservoir. By this means an overcharge of the quick action reservoir is prevented. Brake pipe air will pass from chamber 1 and chamber 2 through passage 44 into the actuating chamber 17 of the diaphragm structure. Passage 44 is connected by passage 45 to the release governing valve chamber 31 so that brake pipe air will flow into said chamber. The actuating chamber 17 is connected by a passage 46 to the service application valve chamber 47 so that the brake pipe air will flow from chamber 17 directly into the application valve chamber. In the passage 46 is arranged a non-return check valve 48 to prevent air flowing from the valve chamber 47 back into the actuating chamber.

When the emergency valve $a$ is in its normal or charging position it uncovers a charging port 49 in the main slide valve seat and this port is connected to the charging chamber 24 below the diaphragm 22 by passage 50 so that brake pipe air will flow into said chamber. It is to be noted that the charging chamber surrounds the charging valve $d$. The rising pressure under the diaphragm 22 will raise said diaphragm until it engages the normal charging stop 51. This stop is held in its normal charging position by a spring 52, said spring being of sufficient tension to hold the diaphragm in normal charging position under a rise of brake pipe pressure at a normal charging rate. An excessive rate of rise of brake pipe pressure will force the diaphragm upwardly and compress the normal charging stop spring and thereby move the charging valve into non-overcharge position. This is the position shown in Fig. 1. The charging diaphragm is pivotally connected to the lever 21 and one end of said lever is operatively connected to the charging valve, its other end being pivoted on a suitable post in the charging chamber so that the upward movement of the charging diaphragm moves the charging valve upward into charging position. In its non-overcharge position the charging valve uncovers the brake pipe reservoir charging port 53 and brake pipe air flows from the charging chamber 24 through said port into a passage 54 which leads to a chamber 55 directly connected to the brake pipe reservoir D. In the passage 54 is arranged a non-return check valve 56 which prevents the back flow of air from the brake pipe reservoir to the charging chamber 24. The passage 54 is connected by a branch 57 to the brake pipe reservoir chamber 23 above the charging diaphragm 22 so that brake pipe reservoir pressure will be present in said chamber. When the pressures in chamber 23 and in the charging chamber 24 have equalized, or substantially so, the spring 52 will force the diaphragm 22 downwardly and move the charging valve to normal charging position (Fig. 2). In the non-overcharge position of the charging valve, as shown in Fig. 1, the brake pipe reservoir alone will be charged and no air will pass to the emergency reservoir.

*Release—Brake pipe reservoir and emergency reservoir charging—Normal charging position (Fig. 2).*

When the brake pipe pressure is raised at a normal charging rate the charging diaphragm 22 will be raised until it contacts with the normal charging stop 51. This will move the charging valve into the position shown in Fig. 2 in which position a charging port 58, through said valve, will be connected by branch ports to a brake pipe reservoir charging port 53ª and to an emergency reservoir charging port 59. Port 53ª is connected to passage 53 which leads to the brake pipe reservoir D, as hereinbefore described. Port 59 is connected to a passage 60 which leads to the emergency reservoir E. In the passage 60 is a non-return check valve 61 which prevents a back flow of air from the emergency reservoir to the charging chamber 24. The emergency reservoir charging passage 60 is connected by a branch passage 102 to the quick release control chamber 25. In said passage is arranged a check valve 103 which seats toward the passage 60 and prevents the flow of air from chamber 25 into passage 60 but permits emergency reservoir air to flow into chamber 25. In the seat of the release control valve e is formed a port 105 and said port is connected by a passage 104 to the emergency reservoir chamber 20. In the graduated release and in the retention release positions of the release governing valve f the port 105 is always open to chamber 25 so that chamber 20 will be charged at the same time and at the same pressure as the emergency reservoir. In the quick release position of the release governing valve the chamber 20 will be charged during the rise of brake pipe pressure and will be fully charged to emergency reservoir pressure when the quick release control valve e assumes normal running position with the pressures equalized on opposite sides of the piston 27 and port 105 slightly open. The movement of the piston 27 and the valve e are hereinafter fully described under the heading "Release after service—Quick release".

The charging valve will remain in this double reservoir charging position and there will be an equalization of pressures in all the reservoirs. The spring 42 will lift the non-overcharge valve 39 and permit the charging of the quick action reservoir F through the charging groove 40 and the charging port 43 at a normal rate. The pressures on opposite sides of the charging diaphragm 22 will equalize and the charging valve will remain in normal charging position until there has been a change in the balance of pressures in the chambers 24 and 23 on opposite sides of the charging diaphragm 22.

*Service application (Fig. 3).*

A reduction of brake pipe pressure permits air to flow from chamber 17 above diaphragm 14 and from chamber 24 beneath diaphragm 22, through passages 44 and 50 respectively, through chamber 1 and groove 35, chamber 4 and passage 34 to the brake pipe thence to atmosphere through the engineer's brake valve; pressure in quick action reservoir chamber 10 flows into chamber 2 through port 43, groove 40, chamber 37, and port 38 so that the pressure in chamber 10 is maintained equal with the brake pipe pressure in chamber 2 and the emergency piston 3 and the valve a will remain stationary. Check valve 61 prevents emergency reservoir pressure from flowing into chamber 24. Brake pipe reservoir pressure is prevented from flowing into chamber 24 by check valve 56 and is prevented from flowing into chamber 17 by check valve 48.

As soon as the pressure in chamber 17 above diaphragm 14 begins to reduce, emergency reservoir pressure in chamber 20 under diaphragm 16 will force the diaphragm assembly 16, 15, 14 upward and through the medium of lever 13, force the release valve c downward closing communication between brake cylinder chamber 18 and atmosphere, while at the same time application valve b will be, through the medium of lever 11, forced downward to establish communication from chamber 47 through port 62 in application valve b and port 63 in its seat, to chamber 18 and the brake cylinder.

The brake pipe reservoir chamber 55 is connected to the application valve chamber 47 through the passage 65. Controlling this passage is a check valve 66. This check valve is in chamber 47 and seats toward the chamber 55 and when closed prevents air passing from chamber 57 to chamber 55 so that during the charging operation brake pipe air cannot flow from chamber 47 into the brake pipe reservoir D. In the chamber 55 and surrounding the stem of the valve 66 is a spring 67, said spring holding the valve 66 on its seat. The check valve 66 is provided with a depending tubular socket 68 in which operates the headed upper end 69 of the valve stem 64, said socket providing a flexible or lost motion connection between the stem 64 and the valve 66. When the application valve is moved downwardly to application position the port 62 will be brought into communication with the port 63 slightly before the head 69 moves the valve 66 from its seat. As soon as the ports 62 and 63 are in communication brake pipe air from chamber 47 and chamber 17 will flow into the brake cylinder chamber 18 and into the brake cylinder. This will result in a local reduction of brake pipe pressure which will increase the speed of the serial action of the control valves throughout the train. The continued downward movement of the application valve to full application position will pull the check valve 66 from its seat, slightly compressing the spring 67. When the check valve 66 is unseated brake pipe reservoir air will flow into chamber 47 and thence to the brake cylinder. When the pressures in chambers 17 and 47 are equal brake pipe air and brake pipe reservoir air will flow together to chamber 18 and thence to the brake cylinder.

The equalizing diaphragm 15 is larger in diameter than the actuating diaphragm and the emergency diaphragm in order that the desired brake cylinder pressure will be built up in the brake cylinder before the service application valve is moved to lap position, as hereinafter described. The degree of brake cylinder pressure developed from a given brake pipe reduction will depend upon the relative effective areas of the diaphragms. The service application valve will remain in service position until the pressure in chamber 18 is such that the downward force exerted on the diaphragm 15 plus the force exerted on diaphragm 14 by the pressure remaining in the actuating chamber 17 is sufficient to overcome the undisturbed emergency reservoir pressure in chamber 20. It is desirable that the brake cylinder pressure be developed at a ratio of two-and-one-half to one of brake pipe reduction, so that upon a ten pound brake pipe reduction a twenty-five pound brake cylinder pressure will be developed before the service valve is moved to lap position. This ratio may be varied by varying the effective area of the diaphragm 15 as compared with the effective areas of the diaphragms 14 and 16. The service valve will remain in service position until the desired brake cylinder pressure has been built up in the brake cylinder and in chamber 18 whereupon the diaphragms will move downward slightly and move the service valve $b$ to closed or lap position thereby closing communication between chamber 47 and chamber 18. A light service lap spring 150 is interposed between the head 69 and the socket of the check valve 66, as shown in Fig. 10, said spring serving to assist the lapping of the service valve when the desired brake cylinder pressure is in chamber 18. This spring may be a very light spring and will not interfere with the movement of the service valve $b$ to service position under a service reduction of brake pipe pressure. The spring 150 will lap the service valve with a slightly lower pressure in chamber 18 than would be necessary with the valve operating without the spring 150. The release valve will move in response to the movements of the diaphragms but that movement will not be sufficient to cause the release valve to assume release position and the release ports will remain closed. In the lap position of the service valve the check valve 66 will return to its seat as shown in Fig. 4.

If it be desired to increase the brake cylinder pressure a further reduction of brake pipe pressure is made and the application valve will again move to service application position and the brake cylinder pressure will be built up in direct proportion to the second brake pipe reduction. The brake cylinder pressure may thus be built up step by step until there is an equalization of pressures in the brake pipe reservoir, brake pipe and brake cylinder. It will, of course, be understood that upon a proper brake pipe reduction a full service braking pressure may be developed in the brake cylinder in response to a single brake pipe reduction.

Should the developed brake cylinder pressure leak down below the desired brake cylinder pressure the emergency reservoir pressure in chamber 20 will move the diaphragm structure upwardly and again place the service valve in service position. If the reduction of brake cylinder pressure through leakage is not sufficient to bring about a movement of the service valve to full service position the service ports 62 and 63 will be brought into partial register and brake pipe air will flow from chamber 47 and from chamber 17 to the brake cylinder. If the service valve is moved to full service position the valve 66 will be unseated and air from the brake pipe reservoir and the brake pipe will flow to the brake cylinder to compensate for leakage.

When the brake pipe pressure is reduced for a service application of the brakes the pressure in chamber 24 below the charging diaphragm 22 will be reduced at the same time and at the same rate. As soon as this reduction begins the diaphragm 22 will be moved downwardly by the pressure in chamber 23 and the charging valve $d$ will be moved to its lowermost position and communication between the chamber 24 and the service reservoir and the emergency reservoir will be closed.

*Release after service—Control valve in quick release position (Fig. 2).*

The control valve is adjusted for quick release operations by moving the release governing valve to quick release position, as shown in Fig. 2. The release of brake cylinder pressure is effected by an increase of brake pipe pressure through the manipulation of the engineer's brake valve, in the usual manner. The increase in brake pipe pressure results in a corresponding increase in pressure in the actuating chamber 17 and in the charging chamber 24. The increasing pressure in chamber 17 forces the diaphragm structures 14, 15 and 16 downwardly and the lever 13 will move the release valve to release position and the lever 11 will move the application valve, but this movement of the application valve will be an idle one. The lost motion connection between the valve stem 64 and the check valve 66 will permit the application valve to move upwardly without disturbing the valve 66. The ports of the application valve will be closed, as shown in Fig. 2.

The release valve $c$ is formed with two release ports 70 and 71. Port 70 is the quick release port and port 71 is the graduated release port. Port 70, when the release valve is in release position registers with a port and passage 72 which leads to a port 73 in the seat of the release governing valve $f$. The release governing valve is formed with a groove 74 which in the quick release position of said valve connects port 73 with the port 75. Port 75 is connected by a passage 76 to a chamber 77 so that brake cylinder pressure may flow from chamber 18 into said chamber when the release governing valve is in quick release position. The chamber 77 is connected by a passage 78 to a large atmospheric port 79. Passage 78 is controlled by a check valve 80 which seats toward the atmospheric port. A small port 81 is formed through the check valve so that when said valve is seated brake cylinder pressure may slowly blow down through said port 81 to atmosphere when the release valve is in release position. The check valve 80 is connected by a stem to a piston 82, said piston reciprocating in a chamber 83. A spring 84 holds the check valve 80 away from its seat so that the chamber 77 is open directly to the atmospheric port 79 thus permitting brake cylinder pressure to flow from passage 76 directly to atmosphere through port 79. The passage 72 is connected directly to the passage 76 through a small leak port or restriction port 85, said leak port functioning more particularly in the graduated release position of the release governing valve, as will be fully hereinafter described.

The graduated release port 71, in the release position of the release valve c registers with a port and passage 86, said passage leading to a port 87 in the release governing valve seat. In the quick release position of the release governing valve port 87 is closed thus rendering the graduated release port 71 ineffective in the quick release position of the release governing valve.

The pressures in chambers 23 and 24 will be substantially equal when the service valve b has been moved back to lap position and, as hereinbefore stated, the charging valve will be in its lowermost position, as shown in Fig. 3. The increasing pressure in chamber 24 will move the diaphragm 22 upwardly to normal charging position, the spring pressed stop 51 holding it in that position so long as the brake pipe pressure is increased at a normal charging rate. The charging valve will be moved upwardly to charging position, as shown in Fig. 2. Port 58 will register with port 53ª and with port 59. Brake pipe air may then flow from chamber 24 through port 58, port 53ª, and passage 54 to the brake pipe reservoir. It will also flow through passage 57 into chamber 23. Check valve 61 will be held to its seat by emergency reservoir pressure and there will be no flow of air from chamber 24 to the emergency reservoir.

The chamber 83, above the piston 82, is connected by passage 88 to a port 89 in the seat of the charging valve. Port 89 is connected by groove 90 in the charging valve to an atmospheric port 91 so that the chamber 83 is connected to atmosphere and the spring 84 will hold the valve 80 in open position.

The charging valve is formed with a port and passage 92 which opens into the chamber 24 through a port 93. Port and passage 92 registers with a port and passage 94 and said passage leads to a port 95 in the seat of the release governing valve. In the quick release position of the release governing valve a cavity 96 connects port 95 with a port and passage 97 and said passage leads to the piston chamber 28 of the quick release control valve e. In the charging position of the charging valve d air will flow from the charging chamber 24 through port 93, passage 92, port and passage 94, cavity 96 and passage 97 into chamber 28. The rising pressure in chamber 28 will force the piston 27 inwardly, or toward the right, as viewed in Fig. 2, and will move the quick release control valve e to quick release position and will uncover port 98. Port 98 is connected by passage 99 to a port 100 in the seat of the release governing valve. In the quick release position of the release governing valve, port 100 is connected by port 101 to the release governing valve chamber 31. As hereinbefore pointed out chamber 31 is connected by passage 45 to passage 44 and this latter passage is connected to the brake pipe through the chamber 2, groove 35 and passage 34. Chamber 25 is connected to the emergency reservoir charging passage 60 by passage 102 in which is arranged the check valve 103, said valve seating toward the emergency reservoir and preventing the passage of air from chamber 25 to the emergency reservoir during the charging operation but permitting emergency reservoir air to flow into the chamber 25. When the port 98 is uncovered emergency reservoir air will flow from chamber 25 through port 98 and the connected ports and passages into the brake pipe for a quick release of the brakes.

The emergency reservoir chamber 20 of the diaphragm structure is connected by passage 104 to port 105 in the seat of the quick release control valve e. The valve e is provided with a cavity 106 which in the release position of said valve connects port 105 to an atmospheric port 107 so that chamber 20 will be vented to atmosphere so long as the valve e remains in its release position. By venting the chamber 20 to atmosphere the diaphragm structure will be given a rapid downward movement to quickly and positively move the valve c to release position. This will make the movement of said valve to release position very sensitive for the reason that a slight rise of pressure in chamber 24 will move the charging valve to charging position and this will bring about the venting of chamber 20 to atmosphere.

When the piston 27 is forced inwardly, the inner end of its stem 26 engages a spring-pressed stop 108 and forces it inwardly until the stem abuts against a rigid stop. This movement places the valve e in its quick release position, as shown in Fig. 2. Around the piston 27 is formed an equalizing groove 109, said groove being open around the piston when the piston is in its inner position, as shown in Fig. 2. The groove 109 is of such a capacity that it will permit the pressures to equalize, in a comparatively short time, in chambers 28 and 29 on opposite sides of the piston 27. When these pressures have equalized, or nearly so, the spring-pressed stop 108 will force the piston and the valve e to normal running position thereby closing the port 98 and partially opening port 105. This movement of the piston 27 partially closes groove 109, leaving said groove slightly open into chamber 28. In this position of the quick release control valve emergency reservoir air may flow to chamber 20 and the flow of emergency reservoir air to the brake pipe, through chamber 31, is stopped. The chamber 29 is of small volume and the groove 109 is of considerable capacity so that the equalization of pressures in chambers 29 and 28 will take place in a comparatively short time. When the piston 27 has been moved back to partially close the groove 109 the pressures will equalize on opposite sides of the piston 27 during any rise of brake pipe pressure in chamber 28 which takes place at a normal charging rate, and the pressures will therefore be maintained at an equilibrium on opposite sides of the piston without further movement of the valve e to release position. If the brake pipe pressure is suddenly increased any considerable amount, such as would result from a "kick-off" movement of the engineer's brake valve, the piston 27 will again be forced inwardly against the tension of the spring-pressed stop 108 and the port 98 will be again uncovered and the chamber 20 will be again connected to atmosphere. The pressures will quickly equalize on opposite sides of the piston 27 and the stop will again move the valve e back to lap position and port 98 again will be closed. When the system is fully charged the charging valve remains in its normal charging position, as shown in Fig. 2, with all of the reservoirs and chambers charged to running pressure.

When the brake pipe pressure is increased rapidly and at a rate greater than the normal charging rate, the rapid increase in pressure in chamber 24 forces the diaphragm 22 upwardly and moves the normal charging stop 51 upwardly and compresses the normal stop spring 52. This additional upward movement of the diaphragm 22 moves the charging valve upwardly into its non-overcharge position, as shown in Fig. 1. In this position of the charging valve, port 93 is in register with port 89 so that air may flow from the charging chamber 24 into the chamber 83 on top of the piston 82 thereby forcing the valve 80 to its seat. This cuts off the free escape of brake cylinder pressure and so long as said valve is held seated brake cylinder pressure will flow to the atmospheric port 79 through the restricted release port 81. As soon as the pressures on opposite sides of diaphragm 22 have equalized the charging valve will be moved into normal charging position by the normal stop spring 52 and chamber 83 will then be vented to atmosphere and the valve 80 will be moved to open position and thereby permit the free exhaust of brake cylinder pressure through port 79. In the non-overcharge position of the charging valve port and passage 92 will remain in communication with port 94 so that the operation of the quick release control valve will be the same as when the charging valve is in its normal charging position.

When brake pipe pressure is reduced for an application of the brakes the pressure in chamber 23 moves the charging valve downwardly to the limit of its movement, as described under the heading "Service application". In this lowermost position of the charging valve port 94 is connected to atmospheric port 91 through a cavity 110 in said valve. This vents chamber 28 to atmosphere and the pressure trapped in chamber 29 will force the piston 27 and the valve e to the limit of its movement toward the left, as viewed in Fig. 2. In this position of the valve the chamber 29 will be connected to atmospheric port 107 by the groove 106 in valve e so that both chambers 28 and 29 will be vented to atmosphere during an application of the brakes (Fig. 3).

In the quick release position of the release governing valve cavity 112 connects port 113 to atmospheric port 113ª. Port 113 is connected by passage 114 to port 115 in the seat of the emergency slide valve. The emergency slide valve is provided with a cavity 116 which, in the normal or inactive position of said valve, connects port 115 to a port 117. This latter port is connected by passage 118 to the retention chamber 19 so that in the quick release operations of the control valve the retention chamber is at all times, except in emergency applications, vented to atmosphere.

*Release after service—Graduated release (Fig. 5).*

The control valve is adjusted for graduated release operations by moving the release governing valve to graduated release position, as shown in Fig. 5. In this position of the release governing valve, cavity 96 is moved to connect port and passage 97 to atmospheric port 111. This places chamber 28 in direct communication with atmosphere. Port 95 is closed. This prevents air flowing to the chamber 28, thus rendering the quick release control valve inoperative and preventing the release of air from chamber 20 in graduated release operations. The pressure in chamber 20, therefore, will remain constant with the emergency reservoir pressure. Cavity 74 is moved out of register with port 75, thereby closing port 75 and shutting off the free exhaust of brake cylinder pressure with port 100 and port 100 is closed. This prevents the flow of brake pipe air from chamber 31 to chamber 25 and also prevents the flow of emergency reservoir air from chamber 25 to chamber 31. Cavity 112 in the release governing valve, in the graduated release position of said valve, as well as in the quick release position of said valve, connects port 113 to the atmospheric port 113$^a$ so that the retention chamber 19 will be vented to atmosphere during graduated release operations. In the graduated release position of the release governing valve, port 87 remains closed so that there can be no release of brake cylinder pressure through the release port 71 of the release valve c. When the release valve c is in release position brake cylinder pressure may slowly blow down through port 70, passage 72, restricted release port 85 and thence through passage 76 and chamber 77 to the brake cylinder exhaust port 79. In all other respects the operation of the control valve in release is precisely as described in connection with the quick release operations. When operating in graduated release chamber 28 is vented to atmosphere, as hereinbefore described, and valve e prevents air flowing from chamber 25 into port 98, so that emergency reservoir air cannot reach the seat of the release governing valve f.

The release of brake cylinder pressure will be in direct proportion to the increase of brake pipe pressure in chamber 17 and the ratio of release will be the same as the ratio of braking pressure resulting from a brake pipe reduction. A five (5) pound increase of pressure in chamber 17 will result in a twelve and one-half (12½) pound reduction of brake cylinder pressure before the release valve is moved back to lap position. Brake cylinder pressure may thus be intermittently stepped down from a maximum service application pressure to zero pressure. In the release movements of the diaphragm structure it is immaterial what position the service valve takes. Said valve will move away from the service ports, and the extent of that movement is not important. This avoids the necessity of accurate and nice adjustments of the service valve. It is also true that the extent of movement of the release valve in the service operations of the diaphragm structure is immaterial. The release ports are moved out of register and the extent of that movement is not important. This avoids the necessity of accurate and nice adjustments of the release valve, except, of course, that both the service valve and the release valve must be so positioned and adjusted that they will operate accurately and positively in performing their independent functions.

*Release after service—Graduated retention release (Fig. 6).*

The control valve is adjusted for graduated retention release operations by moving the release governing valve to retention release position, as shown in Fig. 6. In this position of the release governing valve cavity 74 places a port 119 in communication with the port 73. Port 119 is connected by passage 120 to a port 121 in the seat of the charging valve. The charging valve is formed with a cavity 122 which in the charging position of said valve connects port 121 with a port 123. Port 123 is connected by a passage 124 to the passage 114, this latter passage leading to port 115 in the emergency slide valve seat, as hereinbefore described. Cavity 112 is moved into position to connect port 87 with port 113. This permits brake cylinder pressure to flow from chamber 18 through graduated release port 71, passage 86, port 87, cavity 112, passage 114, port 115, cavity 116 of the emergency valve, port 117 and passage 118 into the retention chamber. Brake cylinder pressure will also flow through the release port 70, passage 72, and thence through the restricted port 85 into passage 76 and through the chamber 77 to the brake cylinder exhaust port 79. So long as the charging valve remains in either one of its charging positions, brake cylinder pressure may flow from passage 114 through passage 124, cavity 122, passage 120, and cavity 74 to the port 73 and thence through the restricted port 85 to atmosphere, as described. So long as the valve c remains in release position and the charging valve remains in charging position brake cylinder pressure will slowly build up in the retention chamber and will slowly blow down through the restricted port 85. The longer these valves remain in the positions indicated the greater will be the development of pressure in the retention chamber. When the release valve is moved to lap position the charging valve will remain in charging position. This will permit the pressure in the retention chamber to slowly blow down to atmosphere, so that if the release valve be held in lap position for any considerable period, depending upon the size and capacity of the ports, all of the pressure in the retention chamber will blow down to atmosphere. If a reduction of brake pipe pressure is made for another application of the brakes, or for the purpose of increasing brake cylinder pressure, the diaphragm 22 and the charging valve d will move downward and close communication between ports 121 and 123, thus trapping any pressure then remaining in the retention chamber and the brake cylinder pressure will be built up at a ratio higher than the standard two and one-half (2½) to one (1) ratio. This is so because the developed brake cylinder pressure in chamber 18 must be high enough to overcome the upward force exerted on diaphragm 15 by the pressure retained in the retention chamber 19. This will result in a higher brake cylinder pressure than would be necessary to move the service valve to lap position if there were no pressure in the retention chamber. The operation of effecting a release of brake cylinder pressure, with the release governing valve in retention release position, is precisely as described under the heading "Release after service—Graduated release". The movement of the release governing valve to retention release position merely effects the building up of pressure in the retention chamber and the release of said pressure to atmosphere.

The release governing valve is moved to retention release position when it is desired to build up a high brake cylinder pressure during cycling operations when the application and release operations follow each other closely. This operation of the brakes is necessary when running a train equipped with the ordinary standard Westinghouse freight brakes down a long grade. In the manipulation of these standard Westinghouse brakes it is necessary to resort to the cycling method of operation, and it is also necessary to use manually adjustable loaded retaining valves.

Emergency application (Fig. 1).

An emergency application is obtained by making a brake pipe reduction sufficiently rapid so that pressure in chambers 1 and 10 cannot be reduced through groove 35 as rapidly as the brake pipe reduction in chamber 4. This rate of brake pipe reduction must be much more rapid than a service brake pipe reduction. Port 43 is of such capacity that the pressure in chamber 10 cannot be reduced at an emergency rate. The result will be that the pressure in the quick action chamber 10 will be sufficient to move piston 3 toward the left compressing the emergency spring 125. The rib 126 on the piston 5 will be forced into engagement with the gasket 127 and the chamber 1 will be sealed from the brake pipe passage 34. The piston 3 will pass beyond the port and passage 38 and thereby prevent the passage of quick action reservoir air from chamber 10 around the piston 3 into chamber 1. The piston 3 will move into position between the ends of the emergency groove 128 so that air may flow through said groove freely from chamber 10 around the piston into chamber 1.

The reduction of pressure in chamber 1 results in an immediate reduction of pressure in chamber 17, and the then undisturbed emergency pressure in chamber 20 forces the diaphragm structure upwardly and places the service valve in service position. This unseats the check valve 66 and permits brake pipe air and brake pipe reservoir air to flow to the brake cylinder before the emergency reservoir air has been released into the quick action chamber 10. The first part of the movement of the piston 3 unseats the poppet valve 129, said valve being connected by a pin 130 to the valve stem 6, said stem being connected to the piston 3, as hereinbefore described. When the poppet valve is unseated, port 129$^a$ is opened, said port leading from the chamber 1 to the seat of the emergency slide valve. Pivotally mounted in the chamber 10 is an emergency valve lever 131. One end of this lever extends into a slot in the stop extension 36 of the piston 3. There is a lost motion between the end walls of said slot and the end of the lever so that the piston may have a short preliminary movement before the lever is engaged and moved on its pivot. The other end of the lever 131 is in position to engage and unseat an emergency check valve 132, said valve being pressed to its seat by a spring 133. Check valve 132 normally closes a passage connecting a chamber 134 to the quick action chamber 10. Chamber 134 is connected by a passage 135 to the emergency reservoir passage 60, and in said passage 135 is a check valve 136 which seats toward the emergency reservoir and prevents air passing from chamber 134 to said reservoir. This check valve, however, permits air to flow from the reservoir into the chamber 134. The movement of the piston 3 to emergency position unseats the check valve 132 and permits emergency reservoir air to flow into chamber 10 and then around the piston through groove 128 into chamber 1. The movement of the emergency valve $a$ to emergency position uncovers emergency port 137 which is connected by passage 138 to the brake cylinder pressure chamber 18 so that emergency reservoir air may flow direct from chamber 1 into chamber 18 and thence to the brake cylinder. In the passage 138 is arranged a non-return check valve 139 which prevents air flowing from chamber 18 to the seat of the emergency valve. When the emergency slide valve is in emergency position port 129$^a$ registers with port 140 and this port is connected by a passage 141 to a chamber 142. In this chamber is arranged an emergency vent valve piston 143 which is connected by a suitable stem to the emergency brake pipe vent valve 33. This valve is normally held seated by a spring 144 and is arranged in chamber 32. As hereinbefore described, chamber 32 is connected directly to the brake pipe C. The emergency brake pipe vent valve 33 controls communication between chamber 32 and a large atmospheric port 145. When the port 129ª registers with port 140 high pressure emergency air flows from chamber 1 into chamber 42 and forces upwardly the piston 143 thereby unseating the valve 33 and connecting the chamber 32 and the brake pipe to the atmospheric port 145 thus venting the brake pipe direct to atmosphere. From chamber 18 the emergency air will flow direct to the brake cylinder.

From chamber 1 the emergency reservoir air will flow through passage 44 into the actuating chamber 17, and through passage 45 into chamber 31 of the release governing valve. In the emergency position of the emergency valve a a port 146 will register with port 117 and permit air to flow from the chamber 1 into said port 117 and through passage 118 into the retention chamber 19 so that the high emergency pressure will equalize in chambers 17, 18, and 19. A port 147 will connect port 49 to an atmospheric port 148 so that chamber 24 will be vented to atmosphere through passage 50, port 49, port 147 and atmospheric port 148. The result of this will be that the brake pipe reservoir pressure in chamber 23 will force the diaphragm 22 downwardly and thereby move the charging valve downwardly and close all of the charging ports as shown in Fig. 7.

The port 146, in the emergency position of the emergency slide valve a will connect chamber 1 to a port and passage 149, said passage leading to passage 104. As hereinbefore described, passage 104 leads to the emergency reservoir chamber 20 of the diaphragm structure. By this means the pressure in chamber 20 will be equalized with the pressures in the other chambers of the diaphragm structure. The piston 143 is provided with a small leak port 143ª to permit the pressure in chamber 142 to slowly leak down to atmosphere after the poppet valve 129 has been seated, as will be hereinafter described.

*Emergency lap position (Fig. 8).*

The diaphragm structure and the service valve will remain in the position shown in Fig. 7 until there has been an equalization of pressures in chambers 17, 18, 19 and 20, whereupon the spring 67 will move the check valve 66 to its seat and partially close the service ports 62 and 63. The service lap spring 150, shown in Fig. 10, will completely lap the service valve ports after an emergency application.

Upon an equalization of pressures in chambers 1 and 10 the emergency spring 125 will move the piston 3 slightly, seating the poppet valve 129. This slight independent movement of the piston 3 is permitted by the pin-and-slot connection 7 between the main valve stem 6 and the supplemental piston 5. Piston 5 will be held seated against the gasket 127 by the high pressure in chamber 1 and said piston will resist further movement of the main piston under the influence of the spring 125. The movement of the piston 3 back to emergency lap position only partially closes the groove 128 so that there may be a slight flow of air from chamber 10 around the piston into chamber 1 in order to maintain the pressures equalized during the emergency lap condition. The lever 131 will hold the check valve 133 slightly open so that emergency reservoir air may slowly flow into chamber 10. The lost motion connection between the emergency valve a and the main valve piston stem 6 will permit of this emergency lap movement of the main piston without moving the emergency slide valve on its seat to any material extent.

*Release after emergency.*

A release after an emergency application is brought about by an increase in brake pipe pressure in the usual manner. The pressure in chamber 4 must be raised above the pressure in chamber 1. This increase in pressure in chamber 4 will force the piston 5 inwardly and said piston, after a short movement, will pick up the main piston stem and force the main piston 3 and the main slide valve inwardly to normal position and bring the stop stem 36 against its rigid stop. The check valve 132 will first be seated to close communication between chamber 10 and the emergency reservoir. Air will flow through groove 35 from chamber 4 into chamber 1 when the piston 5 has moved inwardly beyond the entrance to said groove. In the normal position of the emergency slide valve a port 147 will connect port 140 to atmospheric port 148. This will vent chamber 142 to atmosphere and make certain that the valve 33 will seat. Air from chambers 1 and 2 will flow through passage 44 into the actuating chamber 17 and move the diaphragm structure downwardly thereby placing the release valve c in release position. The port 49 will be uncovered and air will flow from chamber 1 into chamber 24, and as the pressure builds up in said chamber the charging valve will be moved to charging position, as hereinbefore described, either in quick release, graduated release, or retention release depending upon the position of the release governing valve.

What we claim is:

1. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a slide valve, and means operating upon an emergency reduction of brake pipe pressure to move the slide valve to emergency position and to connect an emergency reservoir to the slide valve chamber, said slide valve in emergency position opening an emergency port to admit the emergency reservoir air to the brake cylinder for an emergency application of the brakes.

2. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a slide valve, means operating upon an emergency reduction of brake pipe pressure to move the slide valve to emergency position and to connect an emergency reservoir to the slide valve chamber, said slide valve in emergency position opening an emergency port to admit the emergency reservoir air to the brake cylinder for an emergency application of the brakes, means operating when the emergency valve is in emergency position to close communication between the service valve and the brake pipe, and means controlled by the slide valve and operating when the said slide valve is in emergency position to vent the brake pipe to atmosphere.

3. A control valve for air brake apparatus comprising a service valve subject to brake pipe, brake cylinder and emergency reservoir pressures and operating upon a reduction of brake pipe pressure to place the brake pipe and a brake pipe reservoir in communication with the brake cylinder for a service application of the brakes, the brake cylinder pressure assisting the brake pipe pressure in moving the service valve to lap position, a slide valve, and means operating upon an emergency reduction of brake pipe pressure to move the slide valve to emergency position and to connect an emergency reservoir to the slide valve chamber said slide valve in emergency position opening an emergency port to admit the emergency reservoir air to the brake cylinder for an emergency application of the brakes.

4. A control valve for air brake apparatus comprising a service application valve and a separate release valve subject to brake pipe, brake cylinder and emergency reservoir pressures, the service valve operating upon a reduction of brake pipe pressure to place a source of braking pressure in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere; and means operating upon an emergency reduction of brake pipe pressure to connect an emergency reservoir to the brake cylinder independently of the service valve for an emergency application of the brakes.

5. A control valve for air brake apparatus comprising a service application valve and a separate release valve subject to brake pipe, brake cylinder and emergency reservoir pressures, the service valve operating upon a reduction of brake pipe pressure to place a brake pipe and a brake pipe reservoir in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere; and means operating upon an emergency reduction of brake pipe pressure to connect an emergency reservoir to the brake cylinder independently of the service valve for an emergency application of the brakes.

6. A control valve for air brake apparatus comprising a service application valve and a separate release valve both valves subject to brake pipe, brake cylinder and emergency reservoir pressures, the service valve operating upon a reduction of brake pipe pressure to place a brake pipe and a brake pipe reservoir in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere.

7. A control valve for air brake apparatus comprising a service application valve and a separate release valve subject to brake pipe, brake cylinder and emergency reservoir pressures, the service valve operating upon a reduction of brake pipe pressure to place a source of braking pressure in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere; means operating upon an emergency reduction of brake pipe pressure to connect an emergency reservoir to the brake cylinder independently of the service valve for an emergency application of the brakes; and means operated by an increase of brake pipe pressure to exhaust the emergency reservoir pressure from the release valve structure to permit the brake pipe pressure to quickly and positively move the release valve to release position.

8. A control valve for air brake apparatus comprising a service application valve and a separate release valve both valves subject to brake pipe, brake cylinder and emergency reservoir pressures, the service valve operating upon a reduction of brake pipe pressure to place a source of braking pressure in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere; and means operated by an increase of brake pipe pressure to exhaust the emergency reservoir pressure from the release valve structure to permit the brake pipe pressure to quickly and positively move the release valve to release position.

9. A control valve for air brake apparatus comprising a service application valve and a separate release valve both valves subject to brake pipe, brake cylinder, and emergency reservoir pressures, the service valve operating upon a reduction of brake pipe pressure to place a source of braking pressure in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere; means operated by an increase of brake pipe pressure to exhaust the emergency reservoir pressure from the release valve structure to permit the brake pipe pressure to quickly and positively move the release valve to release position; and manually operable means to render said exhaust means operative or inoperative.

10. A control valve for air brake apparatus comprising a brake cylinder release valve subject to brake pipe, brake cylinder and emergency reservoir pressures and operating upon an increase of brake pipe pressure to place the brake cylinder in communication with an exhaust port for a release of the brakes, the emergency reservoir pressure opposing the brake pipe pressure and tending to move the release valve to lap position, and means operated by an increase of brake pipe pressure to exhaust the emergency reservoir pressure from the release valve structure to permit the brake pipe pressure to quickly and positively move the release valve to release position.

11. A control valve for air brake apparatus comprising a brake cylinder release valve subject to brake pipe, brake cylinder and emergency reservoir pressures and operating upon an increase of brake pipe pressure to place the brake cylinder in communication with an exhaust port for a release of the brakes, the emergency reservoir pressure opposing the brake pipe pressure and tending to move the release valve to lap position, means operated by an increase of brake pipe pressure to exhaust the emergency reservoir pressure from the release valve structure to permit the brake pipe pressure to quickly and positively move the release valve to release position, and manually operable means to render said exhaust means operative or inoperative.

12. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release-governing valve having a graduated-release position and a quick-release position, a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm, and an emergency reservoir chamber in communication with the emergency reservoir, a service valve operatively connected to said diaphragms and in its application position admitting air to the brake cylinder and to the said brake cylinder pressure chamber, a release valve operatively connected to the service valve-operating means and in its release position admitting brake cylinder pressure into the said retention chamber and in its lap position closing said communication, and means to permit the pressure in the retention chamber to slowly blow down to atmosphere without regard to the position of the said release valve and the said service valve.

13. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with a release-governing valve having a graduated-release position and a quick-release position, said valve in its quick-release position providing for a full free exhaust of brake cylinder pressure and in its graduated-release position closing said full and free exhaust, a quick-release control valve, means controlling communication between the emergency reservoir and the brake pipe, means whereby an increase in brake pipe pressure for a release of the brakes will open said quick-release control valve to permit emergency reservoir air to flow to the brake pipe, said means thereafter automatically closing said quick-release control valve during the rise of brake pipe pressure, and means whereby the release-governing valve in its graduated-release position will prevent the opening of the quick-release control valve, said release-governing valve in its quick-release position permitting the opening of said quick-release control valve.

14. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a slide valve, means operating upon an emergency reduction of brake pipe pressure to move the slide valve to emergency position and to connect an emergency reservoir to the slide valve chamber, said slide valve in emergency position opening an emergency port to admit the emergency reservoir air to the brake cylinder for an emergency application of the brakes, and a charging valve subject to brake pipe pressure and to the pressure from a brake pipe reservoir and operating to charging position upon an increase of brake pipe pressure to connect the brake pipe to the brake pipe reservoir and to the emergency reservoir.

15. An air brake apparatus comprising a brake pipe, a brake pipe reservoir, an emergency reservoir, a service valve subject to brake pipe, brake cylinder and emergency reservoir pressures and operating upon a reduction of brake pipe pressure to place the brake pipe and the brake pipe reservoir in communication with the brake cylinder for a service application of the brakes, the brake cylinder pressure assisting the brake pipe pressure in moving the service valve to lap position, a slide valve, means operating upon an emergency reduction of brake pipe pressure to move the slide valve to emergency position and to connect an emergency reservoir to the slide valve chamber, said slide valve in emergency position opening an emergency port to admit the emergency reservoir air to the brake cylinder for an emergency application of the brakes, and means to prevent the brake pipe reservoir pressure reducing with the brake pipe pressure upon a brake pipe reduction for an application of the brakes.

16. An air brake apparatus comprising a brake pipe, a brake pipe reservoir, an emergency reservoir, a service valve subject to brake pipe, brake cylinder and emergency reservoir pressures and operating upon a reduction of brake pipe pressure to place the brake pipe and the brake pipe reservoir in communication with the brake cylinder for a service application of the brakes, the brake cylinder pressure assisting the brake pipe pressure in moving the service valve to lap position, and means to prevent the brake pipe reservoir pressure reducing with brake pipe pressure upon a brake pipe reduction for an application of the brakes.

17. An air brake apparatus comprising a brake pipe, a brake pipe reservoir, an emergency reservoir, a service valve subject to brake pipe, brake cylinder and emergency reservoir pressures and operating upon a reduction of brake pipe pressure to place the brake pipe and the brake pipe reservoir in communication with the brake cylinder for a service application of the brakes, the brake cylinder pressure assisting the brake pipe pressure in moving the service valve to lap position, means whereby the service valve in moving to service position will first place the brake pipe in communication with the brake cylinder and will then place both the brake pipe and the brake pipe reservoir in communication with the brake cylinder, and means to prevent the brake pipe reservoir pressure reducing with brake pipe pressure upon a brake pipe reduction for an application of the brakes.

18. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a charging valve subject to brake pipe pressure and to the pressure from a brake pipe reservoir and operating to normal charging position upon an increase of brake pipe pressure at normal charging rate to connect the brake pipe to the brake pipe reservoir and to the emergency reservoir, and operating to non-overcharge position upon excessive increase of brake pipe pressure above the normal charging rate to close communication with the emergency reservoir, and means operating when the charging valve is in non-overcharge position to restrict the release of brake cylinder exhaust.

19. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a charging valve subject to brake pipe pressure and to the pressure from a brake pipe reservoir and operating to normal charging position upon an increase of brake pipe pressure at normal charging rate and operating to non-overcharge position upon excessive increase of brake pipe pressure above the normal charging rate; and means operating when the charging valve is in non-overcharge position to restrict the release of brake cylinder exhaust.

20. A control valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a charging valve subject to brake pipe pressure and to the pressure from a brake pipe reservoir and operating to normal charging position upon an increase of brake pipe pressure at normal charging rate, and operating to non-overcharge position upon excessive increase of brake pipe pressure above the normal charging rate, a normally open release restricting valve, and means operating when the charging valve is in non-overcharge position to close said release restricting valve to restrict the release of brake cylinder exhaust.

21. A control valve for air brake apparatus comprising a service valve subject to brake pipe, brake cylinder and emergency reservoir pressures and operating upon a reduction of brake pipe pressure to place a source of breaking pressure in communication with the brake cylinder for a service application of the brakes, the brake cylinder pressure assisting the brake pipe pressure in moving the service valve to lap position, a charging valve subject to brake pipe pressure and to the pressure from a brake pipe reservoir and operating to normal charging position upon an increase of brake pipe pressure at normal charging rate and operating to non-overcharge position upon an excessive increase of brake pipe presssure above the normal charging rate; a quick release control valve closing communication between the emergency reservoir and the brake pipe, means operating when the charging valve is in either charging or non-overcharge position to move the quick release control valve to open communication between the emergency reservoir and the brake pipe; and means operating when the charging valve is in non-overcharge position to restrict the release of brake cylinder exhaust.

22. A control valve for air brake apparatus, comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a charging valve subject to brake pipe pressure and to the pressure from a brake pipe reservoir and operating to charging position upon an increase of brake pipe pressure, a quick release control valve normally closing communication between the emergency reservoir and the brake pipe, and means operating when the charging valve is in charging position to move the quick release control valve to open communication between the emergency reservoir and the brake pipe.

23. A control valve for air brake apparatus comprising a service valve operating upon a reduction of brake pipe pressure to place a source of braking pressure in communication with the brake cylinder for a service application of the brakes, a charging valve subject to brake pipe pressure and operating the charging position upon an increase of brake pipe pressure, a quick release control valve normally closing communication between an emergency reservoir and the brake pipe, and means operating when the charging valve is in charging position to move the release control valve to open communication between the emergency reservoir and the brake pipe.

24. A control valve for air brake apparatus comprising a service valve operating upon a reduction of brake pipe pressure to place a source of braking pressure in communication with the brake cylinder for a service application of the brakes, a charging valve subject to brake pipe pressure and operating to normal charging position upon an increase of brake pipe pressure at normal charging rate and operating to non-overcharge position upon an excessive increase of brake pipe pressure above the normal charging rate; a quick release control valve normally closing communication between an emergency reservoir and the brake pipe, means operating when the charging valve is in either charging, or non-overcharge position to move the release control valve to open communication between the emergency reservoir and the brake pipe;

and means operating when the charging valve is in non-overcharge position to restrict the release of brake cylinder exhaust.

25. A control valve for air brake apparatus comprising a service valve operating upon a reduction of brake pipe pressure to place a source of braking pressure in communication with the brake cylinder for a service application of the brakes, a charging valve subject to brake pipe pressure and operating to charging position upon an increase of brake pipe pressure, a quick release control valve normally closing communication between an emergency reservoir and the brake pipe, means operating when the charging valve is in charging position to move the release control valve to open communication between the emergency reservoir and the brake pipe, a manually operable release governing valve, and means whereby the release governing valve may be moved into position to render the charging valve ineffective to operate the quick release control valve.

26. A control valve for air brake apparatus comprising a brake cylinder release valve subject to brake pipe, brake cylinder, and emergency reservoir pressures and operating upon an increase of brake pipe pressure to place the brake cylinder in communication with an exhaust port for a release of the brakes, a charging valve subject to brake pipe pressure and operating to charging position upon an increase in brake pipe pressure, a quick release control valve normally closing communication between an emergency reservoir and the brake pipe means operating when the charging valve is in charging position to move the release control valve to open communication between the emergency reservoir and the brake pipe and to exhaust the emergency reservoir pressure from the release valve structure to thereby permit the brake pipe pressure to quickly and positively move the release valve to release position, a manually operable release governing valve, and means whereby the release governing valve may be moved into position to render the charging valve ineffective to operate the quick release control valve.

27. A control valve for air brake apparatus comprising a brake cylinder release valve subject to brake pipe, brake cylinder, and emergency reservoir pressures and operating upon an increase of brake pipe pressure to place the brake cylinder in communication with an exhaust port for a release of the brakes, a charging valve subject to brake pipe pressure and operating to charging position upon an increase in brake pipe pressure, a quick release control valve normally closing communication between an emergency reservoir and the brake pipe, means operating when the charging valve is in charging position to move the release control valve to exhaust the emergency reservoir pressure from the release valve structure to thereby permit the brake pipe pressure to quickly and positively move the release valve to release position, a manually operable release governing valve, and means whereby the release governing valve may be moved into position to render the charging valve ineffective to operate the quick release control valve.

28. A control valve for air brake apparatus comprising a brake cylinder release valve subject to brake pipe, brake cylinder, and emergency reservoir pressures and operating upon an increase of brake pipe pressure to place the brake cylinder in communication with an exhaust port for a release of the brakes, a quick release control valve, means operating upon an increase of brake pipe pressure to move the release control valve to exhaust the emergency reservoir pressure from the release valve structure to thereby permit the brake pipe pressure to quickly and positively move the release valve to release position, a manually operable release governing valve, and means whereby the release governing valve may be moved into position to render the quick release control valve ineffective.

29. A control valve for air brake apparatus comprising a brake cylinder release valve subject to brake pipe, brake cylinder, and emergency reservoir pressures and operating upon an increase of brake pipe pressure to place the brake cylinder in communication with an exhaust port for a release of the brakes, a quick release control valve normally closing communication between an emergency reservoir and the brake pipe, an operating piston connected to the release control valve, means whereby an increase of brake pipe pressure will move said piston and the release control valve to release position, means to permit the brake pipe pressure to equalize on opposite sides of the said piston when said piston is in release position, means to move said piston and said valve to closed position when the pressures have equalized on opposite sides of the piston, means whereby the release control valve in release position will open communication between the emergency reservoir and the brake pipe and will exhaust the emergency reservoir pressure from the release valve structure to thereby permit the brake pipe pressure to quickly and positively move the release valve to release position, a manually operable release governing valve, and means whereby the release governing valve may be moved into position to render the quick release control valve ineffective.

30. A control valve for air brake apparatus comprising a service application valve and a separate release valve both of said valves subject to brake pipe, brake cylinder and emergency reservoir pressures, the service valve operating upon a reduction of brake pipe pressure to place the brake pipe and a brake pipe reservoir in communication with the brake cylinder for a service application of the brakes, the brake cylinder pressure assisting the brake pipe pressure in moving the service valve to lap position, the release valve operating upon an increase of brake pipe pressure to place the brake cylinder in communication with atmosphere, an emergency valve operating upon an emergency reduction of brake pipe pressure to connect an emergency reservoir to the brake cylinder independently of the service valve, and a charging valve subject to brake pipe pressure and the pressure from a brake pipe reservoir and operating upon an increase of brake pipe pressure to connect the brake pipe to a brake pipe reservoir and an emergency reservoir.

31. A fluid pressure brake control valve operating upon a reduction of brake pipe pressure to admit air to the brake cylinder for an application of the brakes and operating upon an increase in brake pipe pressure to connect the brake cylinder to atmosphere, and provided with a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, and an emergency chamber in communication with the emergency reservoir, a service valve operatively connected to said diaphragms and in its movement to application position first admitting brake pipe air to the brake cylinder and the brake cylinder pressure chamber and then admitting brake pipe and brake pipe reservoir air to the brake cylinder and to the said brake cylinder pressure chamber, means to prevent brake pipe reservoir air flowing to the brake pipe when the service valve is in full service position, a release valve operatively connected to the service valve-operating means and in its release position permitting brake cylinder pressure to flow to atmosphere.

32. A fluid pressure brake control valve operating upon a reduction of brake pipe pressure to admit air to the brake cylinder for an application of the brakes and operating upon an increase in brake pipe pressure to connect the brake cylinder to atmosphere, and provided with a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, and an emergency chamber in communication with the emergency reservoir; a service valve operatively connected to said diaphragms and in its movement to application position first admitting brake pipe air from the actuating chamber to the brake cylinder and the brake cylinder pressure chamber and then admitting brake pipe and brake pipe reservoir air to the brake cylinder and to the said brake cylinder pressure chamber, and means to prevent brake pipe reservoir air flowing to the actuating chamber when the service valve is in full service position.

33. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release-governing valve having a graduated-release position, a quick-release position and a retention-release position; a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm and an emergency reservoir chamber in communication with the emergency reservoir; a service valve operatively connected to said diaphragms and in its application position admitting air to the brake cylinder and to said brake cylinder pressure chamber; a release valve operatively connected to the service valve operating means and in its release position connecting brake cylinder pressure to an exhaust port, the release governing valve being interposed between the release valve and the brake cylinder exhaust, the release governing valve in its quick release position providing for a free exhaust of brake cylinder pressure, in its graduated release position providing for a restricted exhaust of brake cylinder pressure and in its retention-release position providing for a restricted exhaust of brake cylinder pressure and admitting brake cylinder pressure into the retention chamber; a charging valve movable to charging position by an increase of brake pipe pressure; means whereby the charging valve in charging position will permit pressure in the retention chamber to slowly blow down to atmosphere when the release governing valve is in retention release position; and means whereby the charging valve will stop the exhaust of air from the retention chamber upon a reduction of brake pipe pressure.

34. A control valve for air brake apparatus, comprising a service application valve, a release valve subject to brake pipe, brake cylinder and emergency reservoir pressures, the service valve operating upon a reduction of brake pipe pressure to place a source of braking pressure in communication with the brake cylinder for a service application of the brakes, the release valve operating upon an increase of brake pipe pressure to place the brake cylinder in communication with atmosphere independently of the service application valve.

35. A control valve for air brake apparatus, comprising a service application valve, a release valve subject to brake pipe, brake cylinder and emergency reservoir pressures, the service valve operating upon a reduction of brake pipe pressure to place the brake pipe and the brake pipe reservoir in communication with the brake cylinder for a service application of the brakes, the release valve operating upon an increase of brake pipe pressure to place the brake cylinder in communication with atmosphere independently of the service application valve.

36. A fluid pressure control valve operating upon a reduction of brake pipe pressure to admit air to the brake cylinder for an application of the brakes and operating upon an increase of brake pipe pressure to connect the brake cylinder to atmosphere and provided with a release valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, an emergency reservoir chamber in communication with the emergency reservoir; a service valve movable to application position upon a reduction of brake pipe pressure and in its application position admitting air to the brake cylinder and to the said brake cylinder pressure chamber; and a release valve operatively connected to the said valve-operating means and operating to release position upon an increase of brake pipe pressure and in its release position placing the brake cylinder in communication with an exhaust port independently of the service application valve.

37. A fluid pressure control valve operating upon a reduction of brake pipe pressure to admit air to the brake cylinder for an application of the brakes and operating upon an increase of brake pipe pressure to connect the brake cylinder to atmosphere and provided with a release valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, and an emergency reservoir chamber in communication with the emergency reservoir; a service valve movable to application position upon a reduction of brake pipe pressure and in its application position admitting brake pipe and brake pipe reservoir air to the brake cylinder and to the said brake cylinder pressure chamber; and a release valve operatively connected to the said valve-operating means and operating to release position upon an increase of brake pipe pressure and in its release position placing the brake cylinder in communication with an exhaust port independently of the service valve.

38. A control valve for air brake apparatus comprising a service valve subject to brake pipe, brake cylinder and emergency reservoir pressures and operating upon a reduction of brake pipe pressure to place a source of braking pressure in communication with the brake cylinder for a service application to the brakes, the brake cylinder pressure assisting the brake pipe pressure in moving the service valve to lap position, and a charging valve subject to brake pipe pressure and to the pressure from a brake pipe reservoir and operating to normal charging position upon an increase of brake pipe pressure at normal charging rate to connect the brake pipe to the brake pipe reservoir and to the emergency reservoir, and operating to non-overcharge position upon excessive increase of brake pipe pressure above the normal charging rate to close communication with the emergency reservoir.

39. A control valve for air brake apparatus comprising a service valve subject to brake pipe, brake cylinder and emergency reservoir pressures and operating upon a reduction of brake pipe pressure to place the brake pipe and a brake pipe reservoir in communication with the brake cylinder for a service application of the brakes, the brake cylinder pressure assisting the brake pipe pressure in moving the service valve to lap position, and a charging valve subject to brake pipe pressure and to the pressure from a brake pipe reservoir and operating to normal charging position upon an increase of brake pipe pressure at normal charging rate to connect the brake pipe to the brake pipe reservoir and to the emergency reservoir, and operating to non-overcharge position upon excessive increase of brake pipe pressure above the normal charging rate to close communication with the emergency reservoir.

40. A control valve for air brake apparatus comprising a service valve operating upon a reduction of brake pipe pressure to place a source of braking pressure in communication with the brake cylinder for a service application of the brakes, and a charging valve subject to brake pipe pressure and to the pressure from a brake pipe reservoir and operating to normal charging position upon an increase of brake pipe pressure at normal charging rate to connect the brake pipe to the brake pipe reservoir and to the emergency reservoir, and operating to non-overcharge position upon excessive increase of brake pipe pressure above the normal charging rate to close communication with the emergency reservoir.

41. A control valve for air brake apparatus comprising a brake cylinder release valve operating upon an increase of brake pipe pressure to place the brake cylinder in communication with an exhaust port for a release of the brakes, a quick release control valve normally closing communication between an emergency reservoir and the brake pipe, an operating piston connected to the release control valve, means whereby an increase of brake pipe pressure will move said piston and the release control valve to release position, means to permit the brake pipe pressure to equalize on opposite sides of the said piston when said piston is in release position, means to move said piston and said valve to closed position when the pressures have equalized on opposite sides of the piston, and means whereby the release control valve in release position will open communication between the emergency reservoir and the brake pipe.

42. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release-governing valve having a graduated-release position and a quick-release position, a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm, and an emergency reservoir chamber in communication with the emergency reservoir, a service valve operatively connected to said diaphragms and in its application position admitting air to the brake cylinder and to the said brake cylinder pressure chamber, a release valve operatively connected to the service valve-operating means and in its release position admitting brake cylinder pressure into the said retention chamber and in its lap position closing said communication, a charging valve subject to brake pipe pressure and operating to charging position upon an increase of brake pipe pressure, and means to permit the pressure in the retention chamber to slowly blow down to atmosphere when the charging valve is in charging position.

43. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release-governing valve having a graduated-release position and a quick-release position, a service valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm, and an emergency reservoir chamber in communication with the emergency reservoir, a valve means operatively connected to the said diaphragms and in its application position admitting air to the brake cylinder and to the said brake cylinder pressure chamber and in its release position admitting brake cylinder pressure into the said retention chamber and in its lap position closing said communication, a charging valve subject to brake pipe pressure and operating to charging position upon an increase of brake pipe pressure, and means to permit the pressure in the retention chamber to slowly blow down to atmosphere when the charging valve is in charging position.

In testimony whereof we hereunto affix our signatures this 1st day of October, 1926.

MAURICE E. HAMILTON.
RAYMOND R. HOPKINS.